United States Patent
Pirozzi et al.

(10) Patent No.: US 8,656,212 B2
(45) Date of Patent: Feb. 18, 2014

(54) DETECTION AND REDUCTION OF EXCESSIVE SNMP TRAFFIC

(75) Inventors: Timothy J. Pirozzi, Rochester, NH (US); Jerome S. Simms, Toronto (CA); Jonathan Caron, Nottingham, NH (US)

(73) Assignee: CA, Inc., Islandia, NY (US)

( * ) Notice: Subject to any disclaimer, the term of this patent is extended or adjusted under 35 U.S.C. 154(b) by 3 days.

(21) Appl. No.: 13/399,367

(22) Filed: Feb. 17, 2012

(65) Prior Publication Data
US 2012/0151283 A1   Jun. 14, 2012

Related U.S. Application Data

(63) Continuation of application No. 12/634,821, filed on Dec. 10, 2009, now Pat. No. 8,145,939.

(51) Int. Cl.
*G06F 11/00* (2006.01)
*G06F 11/07* (2006.01)

(52) U.S. Cl.
USPC .............. 714/4.2; 714/4.1; 714/4.3; 714/56

(58) Field of Classification Search
USPC .................... 714/4.1, 4.2, 4.3, 43, 56
See application file for complete search history.

(56) References Cited

U.S. PATENT DOCUMENTS

| | | | |
|---|---|---|---|
| 6,425,006 B1 | 7/2002 | Chari et al. | |
| 6,697,970 B1 | 2/2004 | Chisholm | |
| 7,103,795 B1 | 9/2006 | Hansen | |
| 7,165,120 B1 | 1/2007 | Giles et al. | |
| 2004/0153823 A1 | 8/2004 | Ansari | |
| 2004/0187048 A1 | 9/2004 | Angamuthu et al. | |
| 2007/0220365 A1* | 9/2007 | Castellani et al. | 714/46 |
| 2008/0307269 A1 | 12/2008 | Bennett et al. | |
| 2009/0183025 A1 | 7/2009 | Palazzolo et al. | |
| 2011/0145660 A1 | 6/2011 | Pirozzi et al. | |

OTHER PUBLICATIONS

"U.S. Appl. No. 12/634,821, Final Office Action mailed Sep. 13, 2011", 14 pgs.
"U.S. Appl. No. 12/634,821, Non Final Office Action mailed Mar. 24, 2011", 17 pgs.
"U.S. Appl. No. 12/634,821, Notice of Allowance mailed Nov. 28, 2011", 5 pgs.
"U.S. Appl. No. 12/634,821, Response filed Jun. 23, 2011 to Non Final Office Action mailed Mar. 24, 2011", 14 pgs.
"U.S. Appl. No. 12/634,821, Response filed Nov. 14, 2011 to Final Office Action mailed Sep. 13, 2011", 11 pgs.

* cited by examiner

*Primary Examiner* — Joseph Schell
(74) *Attorney, Agent, or Firm* — Schwegman Lundberg & Woessner, P.A.

(57) ABSTRACT

Various embodiments herein include at least one of systems, methods, and software to detect and reduce messages from network entity management clients that are not utilized by a network management system. Once identified, the network management system may send a command to the network entity management clients to no longer send particular message types to the network management system. The network management system may also, or alternatively, be configured to take no action when such messages are subsequently received.

18 Claims, 5 Drawing Sheets

DETECTION AND REDUCTION OF EXCESSIVE SNMP TRAFFIC

RELATED APPLICATION

This application is a continuation of and claims the benefit of priority under 35 U.S.C. §120 of U.S. patent application Ser. No. 12/634,821, filed on Dec. 10, 2009, which is hereby incorporated by reference herein in its entirety.

BACKGROUND INFORMATION

In many network environments, network devices and processes such as routers, switches, identity authentication services, and other devices and processes are configured to send Simple Network Management Protocol (SNMP) trap messages to a network management system. However, the trap messages, when received by the network management system are often ignored. As a result, many SNMP trap messages needlessly consume device, network, and network management system resources, which can increase network latency, divert network and processing resources from more critical needs, and detract from network stability.

SUMMARY

Various embodiments herein include at least one of systems, methods, and software to detect and reduce messages from network entity management clients that are not utilized by a network management system. Once identified, the network management system may send a command to the network entity management clients to cease sending particular message types to the network management system. The network management system may also, or alternatively, be configured to take no action when such messages are subsequently received.

One embodiment is in the form of a system that includes at least one processor, a memory device, a network interface device, and a network management system held in the memory device and executable on the at least one processor. The network management system is executable on the at least one processor to generate and display a listing of message types received from at least one network entity via the network interface device, the report of messages including a listing of violations or errors represented in the received messages for which in response within the network management system, no action was taken. The network management system is further executable by the at least one processor to provide a network entity user interface on the display device to receive selection input via an input device of the system, the input received to modify a configuration of at least one of the network entities and the network management system for how a network entity violation or error selected from the list of message types is processed. Further, the network management system is executable by the at least one processor to generate and send, in response to the received selection input into the network entity user interface, a configuration message to a target recipient to modify a configuration of how the particular violation or error is processed by the target recipient, the target recipient including at least one of the network entities or the network management system.

Another embodiment is in the form of a computer-readable storage medium, with instructions stored thereon, which when executed by at least one processor of a computer, cause the computer to generate a listing of message types received from at least one network entity. The report of messages in such embodiments may include a listing of violations or errors represented in the received messages for which in response within a network management system, no action was taken. The instructions are further executable by the at least one processor to cause the computer to provide a network entity user interface to receive input to modify a configuration of at least one of network entities and the network management system for how a network entity violation or error selected from the list of message types is processed. The instructions are also executable by the at least one processor to cause the computer to generate and send a configuration message to a target recipient to modify a configuration of how a particular violation or error is processed by the target recipient.

Yet a further embodiment includes a method of receiving, over a network from network entities, and storing, on a data storage device, messages each identifying a source network entity and including data representative of a violation or error on the respective source network entity. The method in such embodiments includes tracking responsive actions taken to each received message and storing a representation of the responsive actions in association with a respective violation or error and executing an instruction set on a computer processor to generate a report of messages received from the network entities. The report of messages may include a count of violations or errors represented in the messages received from the network entities in view of actions taken in response to particular violations or errors. The method further includes providing a configuration message generation user interface to receive input for generation of at least one configuration message to modify how a particular network entity violation or error is processed. Additionally, the method includes generating and sending a configuration message to at least one target to modify how a particular violation or error is processed by the at least one target.

DETAILED DESCRIPTION

Organizations commonly manage and monitor networked computing environments utilizing network management systems, such as the SPECTRUM® system developed by CA, Inc. of Islandia, N.Y. Network management systems provide mechanisms accessible through a defined protocol for communication with and configuration of devices and processes that operate and execute within a networked computing environment. An example of such a protocol is Simple Network Management Protocol (SNMP). Although SNMP is discussed herein for purposes of consistency, the present subject matter is also applicable to other network management protocols.

SNMP is part of the Internet Protocol Suite defined by the Internet Engineering Task Force. SNMP is a UDP-based network protocol that allows for monitoring of network devices and processes that include an SNMP-enabled client process. SNMP includes a set of standards for network and device management and exposes management data in the form of variables on a managed system that are descriptive of configuration settings. These variables, held by devices and processes can be queried and set through utilization of a network management system configured to communicate with and manage the devices and processes.

When an SNMP enabled device or process, jointly referred to herein as network entities, encounters an error or other condition the network entity is configured to report, a trap, inform, or other message type is sent over the network to the network management system. Trap, inform, and other message types are simply referred to as traps herein, unless explicitly stated otherwise.

In many network environments, network entities such as routers, switches, server processes, and other SNMP-enabled network devices and processes are configured to send all traps to a network management system to monitor. However, in some cases these traps are not used and are simply ignored. This can lead to unnecessary SNMP traffic on the network and unnecessary consumption of processing resources by the network entities detecting the trap condition and by the network management system processing the SNMP messages. Network congestion can result and a potential for packets being dropped on the network do to the excessive traps. Traps that are not considered or are otherwise ignored can be thought of as "white noise" or "background noise."

Various embodiments herein provide a network management system administrator knowledge of SNMP traps that are not considered or are otherwise ignored. The administrator is further provided with configuration tools to eliminate, reduce, and otherwise minimize the impact of the unutilized messages. For example, some embodiments provide counts by trap type across the network on a daily basis and may provide details as to the traps that are not utilized. If the administrator desires to address an unutilized trap message type, configuration tools are provided in some embodiments to generate and send configuration messages to network entity sources of the messages to configure the respective network entities to stop the messages. The administrator may also, or alternatively, be provided configuration tools to configure the network management system to simply ignore the unutilized messages and perform no further processing when such a message is received. Through use of such embodiments, unutilized trap messages may be eliminated or the potential impact thereof may be minimized. These and other embodiments are described in detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed. The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer-readable media such as a memory, a hard disk, or other type of storage devices. Further, described functions may correspond to modules, which may be software, hardware, firmware, or any combination thereof. Multiple functions are performed in one or more modules as desired, and the embodiments described are merely examples. The software is executed on at least processor such as a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
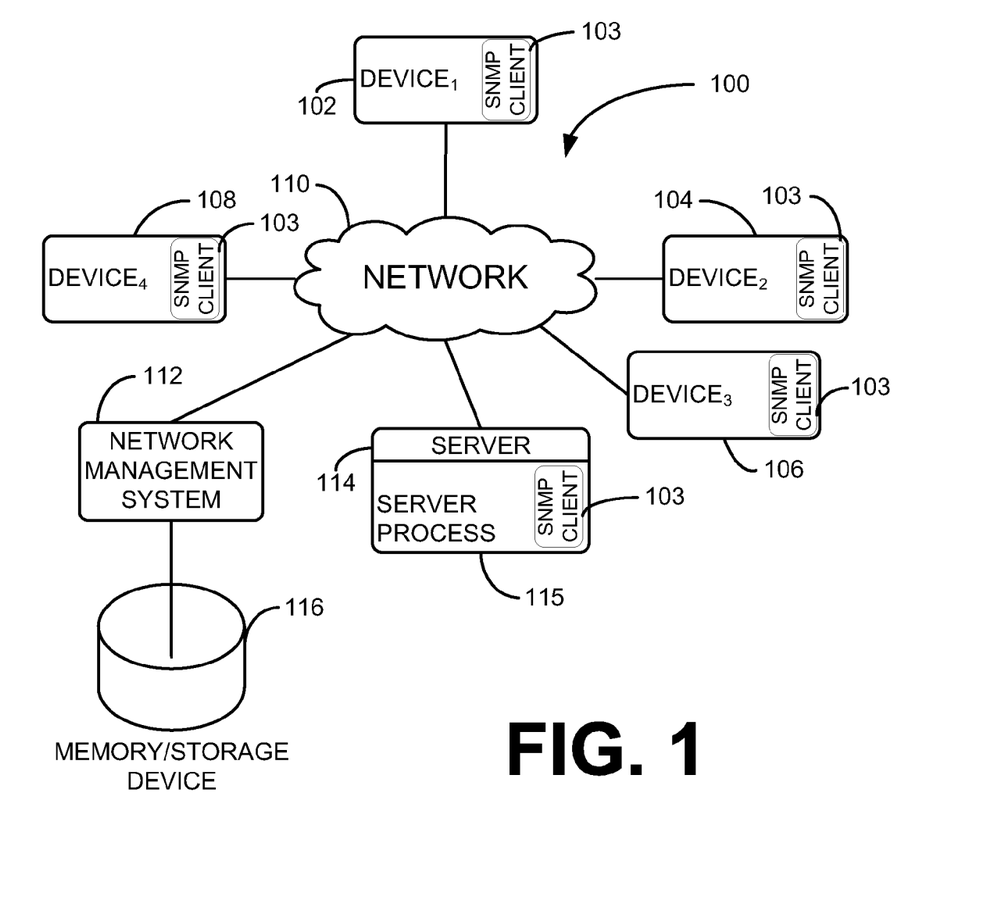
FIG. 1 is a block diagram of a system according to an example embodiment.

FIG. 1 is a logical diagram of a system 100 according to an example embodiment. The illustrated system 100 includes network entities, such as devices$_{1-4}$ 102, 104, 106, 108 that are communicatively connected to a network 110. The devices$_{1-4}$ 102, 104, 106, 108 may be physical or logical entities. Physical entities may include routers, hubs, server machines, computers, and other devices. Logical entities may include server processes, database management systems, network management processes, and other processes that may execute on a physical entity. For example, server process 115 that executes on server computer 114. Each of the network entities 102, 104, 106, 108, and 115 include an SNMP client 103. SNMP clients 103 are also commonly referred to as SNMP agents. Network entities 102, 104, 106, 108, 115 managed by an SNMP client 103 are also commonly referred to as "slave devices" or "slave entities."

The SNMP client 103 is a process that operates on the respective network entities 102, 104, 106, 108, and 115 to monitor and manage the network entity through interaction over the network 110 with a network management system 112. The network management system 112 is commonly referred to as a "master." Although each of the SNMP clients 103 are represented identically within the system 100 and amongst the various network entities 102, 104, 106, 108, and 115, the individual SNMP client may vary in form. For example, the SNMP client may be in the form of hardware, software, or a combination thereof depending on the particular network entity 102, 104, 106, 108, and 115 on which the SNMP client 103 is deployed. The network 110 may include one or more network types such as wired or wireless local area networks, system area networks, wide area networks, the Internet, and the like.

The network management system 112 is operable to communicate with the network entities 102, 104, 106, 108, and 115 over the network 110. The network management system 112 receives trap messages from the SNMP clients 103 of the respective network entities 102, 104, 106, 108, and 115, records the trap messages such as by storing the messages in a memory or data storage device 116, makes the trap messages available to an administrator or other user, and tracks actions or the lack thereof with regard to the trap messages. The network management system 112 is further operable to provide a listing or other report of the trap messages to an administrator to view what trap messages have been received and what actions have been taken. The listing or report, in some embodiments, may provide summary information for trap messages received over a particular period such as one day or a rolling 24-hour period. The listing or report may provide a summary of trap message types and a count of each trap message type.

For example, users commonly mistype their login credentials when logging into a system. Failure to authenticate login credentials is one violation or error that may trigger an SNMP trap. Failure to authenticate login credentials also commonly happens within a network environment of an organization at the start of the employees' workday. It is quite common that a large volume of failure to authenticate login credentials SNMP messages are received in a very small time period. As a result, the network and network management system 112 can quickly get overwhelmed by a large number of SNMP messages and this can happen every day. The listing or report of SNMP message types is likely to include a large count of the failure to authenticate login credentials message type. The listing or report in some embodiments provides a link to at least one user interface that provides configuration tools to allow the administrator to modify configurations of the network entity sources of the failure to authenticate login credentials SNMP messages to no longer generate and send the messages. In some embodiments, the listing report may also, or alternatively, provide a link to a user interface that provides configuration tools to allow the administrator to modify the network management system 112 configuration forego any processing when such a message is received. In some embodiments, a particular network entity may not be configurable by the network management system 112 to stop the particular SNMP message type from being sent. In such instances where the network management system 112 is unable to control what messages are sent, the network management system 112 can be configured to mitigate the impact of the messages by not processing the messages any further once the message is received and identified.

In one embodiment, the network entities 102, 104, 106, 108, and 115 are operating and are monitored by their respective SNMP clients 103. When an SNMP client 103 detects a violation of a policy or an error, an SNMP message is generated by the detected SNMP client 103 and the message is sent to the network management system 112 over the network 110. The network management system 112 may then process the message and store it in the memory or storage device 116. The SNMP message may be presented by the network management system 112 to an administrator who may click an ignore button, take no action with regard to the SNMP message, or may take an action. The action or lack thereof is tracked by the network management system 112 and a record of the action is stored in the memory or storage device 116 in association with the SNMP message, or a representation thereof. An administrator, or other user, of the network management system 112 may choose to view a report of received SNMP messages and actions taken. The report will include a listing of the received SNMP message and the particular action taken. If no action was taken or the message was ignored, the administrator may be provided with configuration options to mitigate exposure from of unutilized SNMP messages. The configuration options may include one or more of a change to the configuration of one or more network entities 102, 104, 106, 108, 115 that generated or are capable generating the particular message that was ignored and changing a configuration of the network management system 112 to take no further action once the message type is identified.

Figure 2:
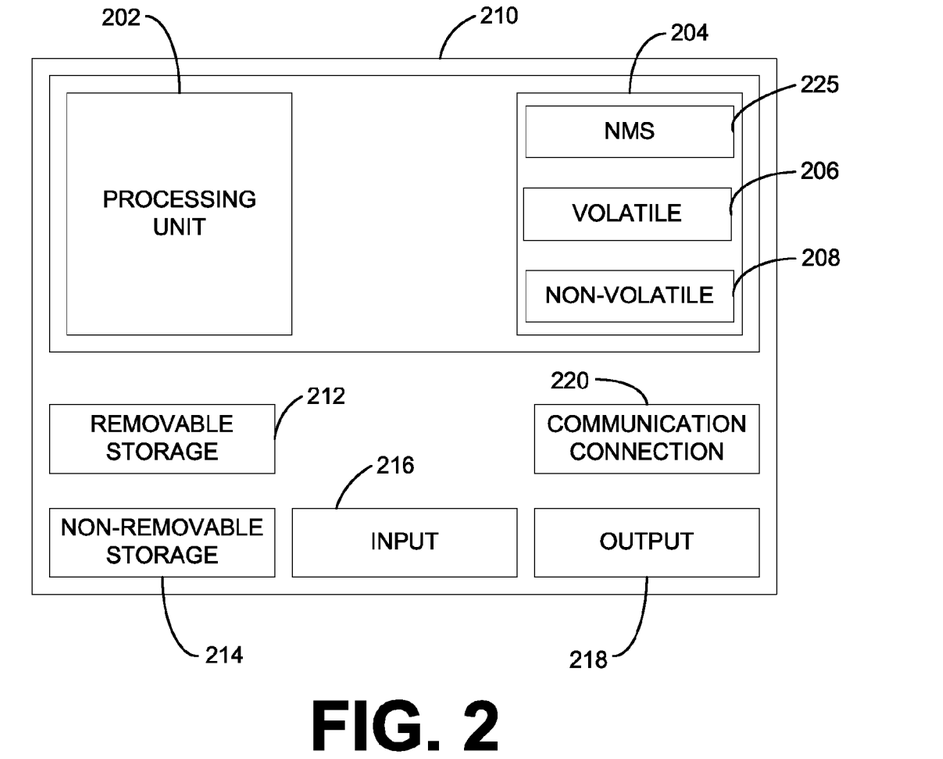
FIG. 2 is a block diagram of a computing device according to an example embodiment.

FIG. 2 is a block diagram of a computing device according to an example embodiment. In one embodiment, multiple such computer systems are utilized in a distributed network to implement multiple components in a transaction-based environment. An object-oriented architecture may be used to implement such functions and communicate between the multiple systems and components. One example computing device is in the form of a computer 210 upon which a network management system 225 execute. The computer 210 may include at least one processing unit 202, memory 204, removable storage 212, and non-removable storage 214. Memory 204 may include volatile memory 206 and non-volatile memory 208. Computer 210 may include—or have access to a computing environment that includes—a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 210 may include or have access to a computing environment that includes input 216, output 218, and a communication connection 220. The computer 210 typically operates in a networked environment using a communication connection 220 to connect to one or more network entities. The communication connection 220 may include a Local Area Network (LAN), a Wide Area Network (WAN), a Virtual Private Network (VPN) or other networks.

Computer-readable instructions stored on a computer-readable storage medium are executable by the at least one processing unit 202 of the computer 210. A hard drive, CD-ROM, and RAM are some examples of articles including a computer-readable storage medium. For example, the network management system 225 may be stored on a computer-readable storage medium as an instruction set executable by the at least one processing unit 202 to cause the computer 210 to perform one or more of the methods or processed described herein.

Figure 3:
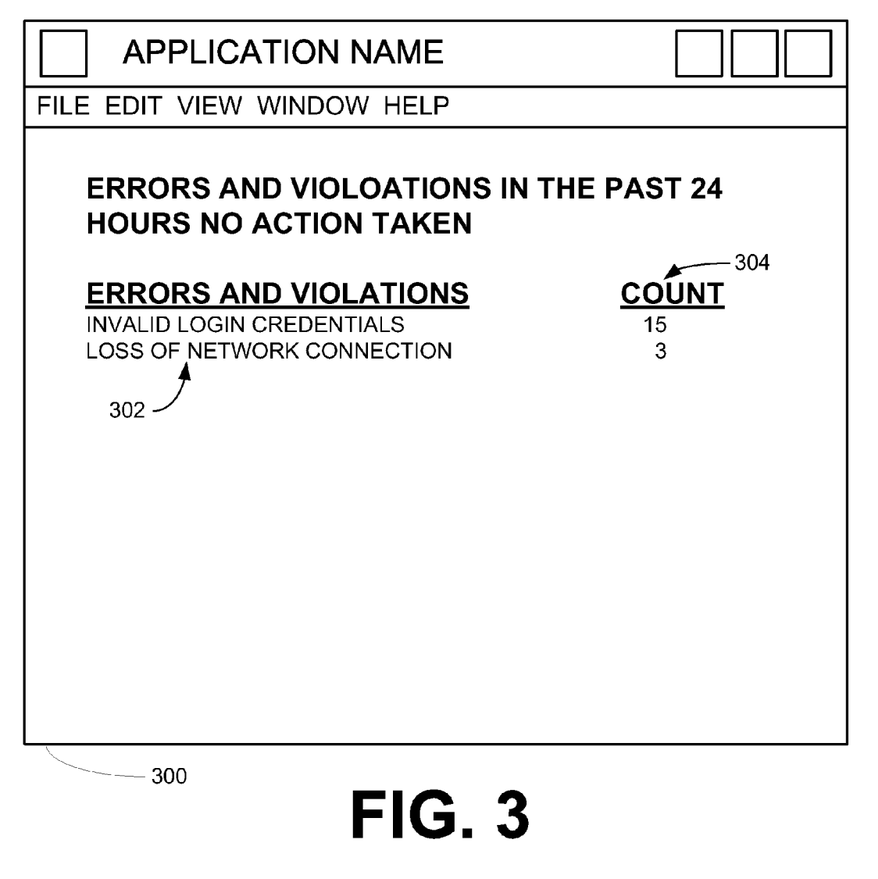
FIG. 3 is a user interface illustration according to an example embodiment.
Figure 4:
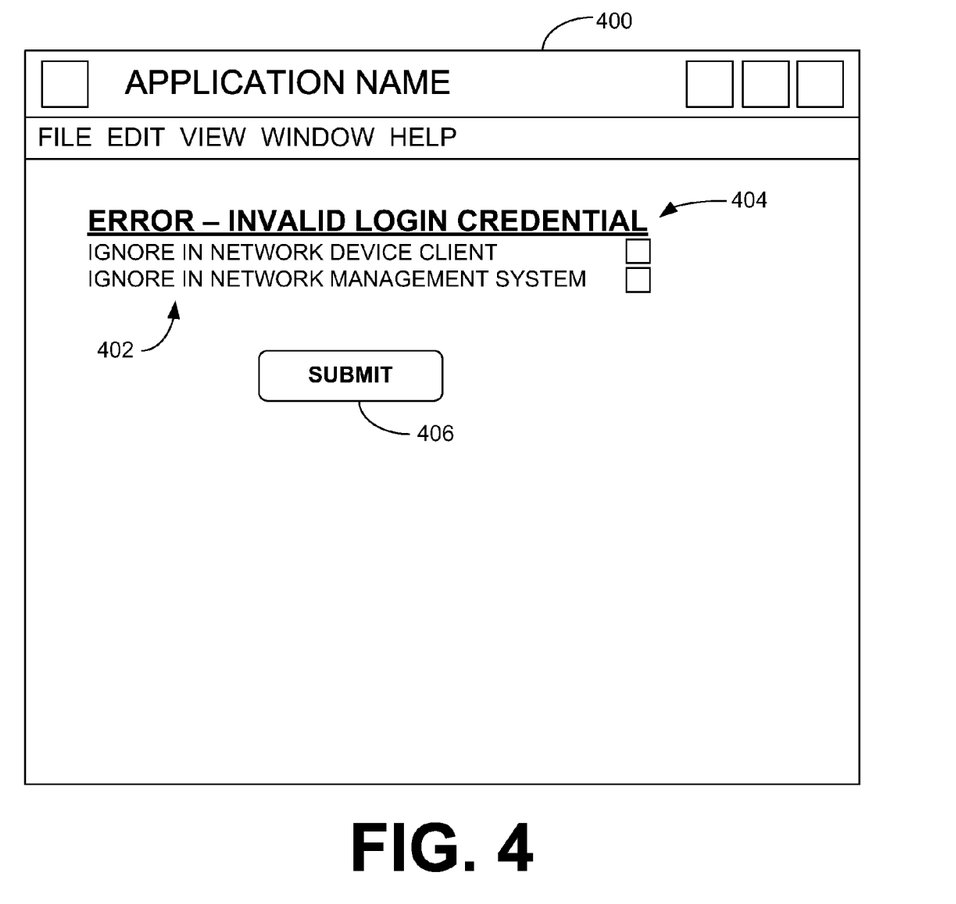
FIG. 4 is a user interface illustration according to an example embodiment.

FIG. 3 is a user interface 300 illustration according to an example embodiment. The user interface 300 includes a listing or report of errors or violations for which no action has been taken. For example, an administrator, when presented with a listing of errors or violations identified in SNMP messages received from SNMP clients of network entities, either took no action, clicked an ignore button, or otherwise ignored the SNMP messages. The user interface 300 includes a listing 302 of two messages in the illustrated embodiment and a count 304 of each message type. The administrator may click one of the listed messages or select a menu item to open a configuration message generation user interface, such as is illustrated in FIG. 4. For example, the user may click, or otherwise select, the "INVALID LOGIN CREDENTIALS" error and violation that includes a count of 15.

FIG. 4 is a user interface 400 illustration according to an example embodiment. The user interface 400 is an example of a configuration message generation user interface that may be displayed following the click or selection of the "INVALID LOGIN CREDENTIALS" error and violation from the user interface 300 of FIG. 3. The user interface 400 provides four options that may be selected for generation and sending of one or more configuration messages to modify how the particular network entity error and violation of "INVALID LOGIN CREDENTIALS" is processed. The options 402 include "IGNORE IN NETWORK DEVICE CLIENT" and "IGNORE IN NETWORK MANAGEMENT SYSTEM." These options 402 may be selected through clicking the corresponding check box 404 user interface 400 controls.

Although only two options 402 are listed, the options 402 are still four as the administrator may select neither, both, one, or the other of the check boxes. The administrator may then click the submit button 406 and the necessary commands will be generated by the network management system and sent to the SNMP clients of the appropriate network entities from which the violation and error messages were received. The commands sent to the SNMP clients are configuration messages that are executable on a processor of the network entities to modify how the particular violation or error is processed by the SNMP client of the receiving network entity.

Figure 5:
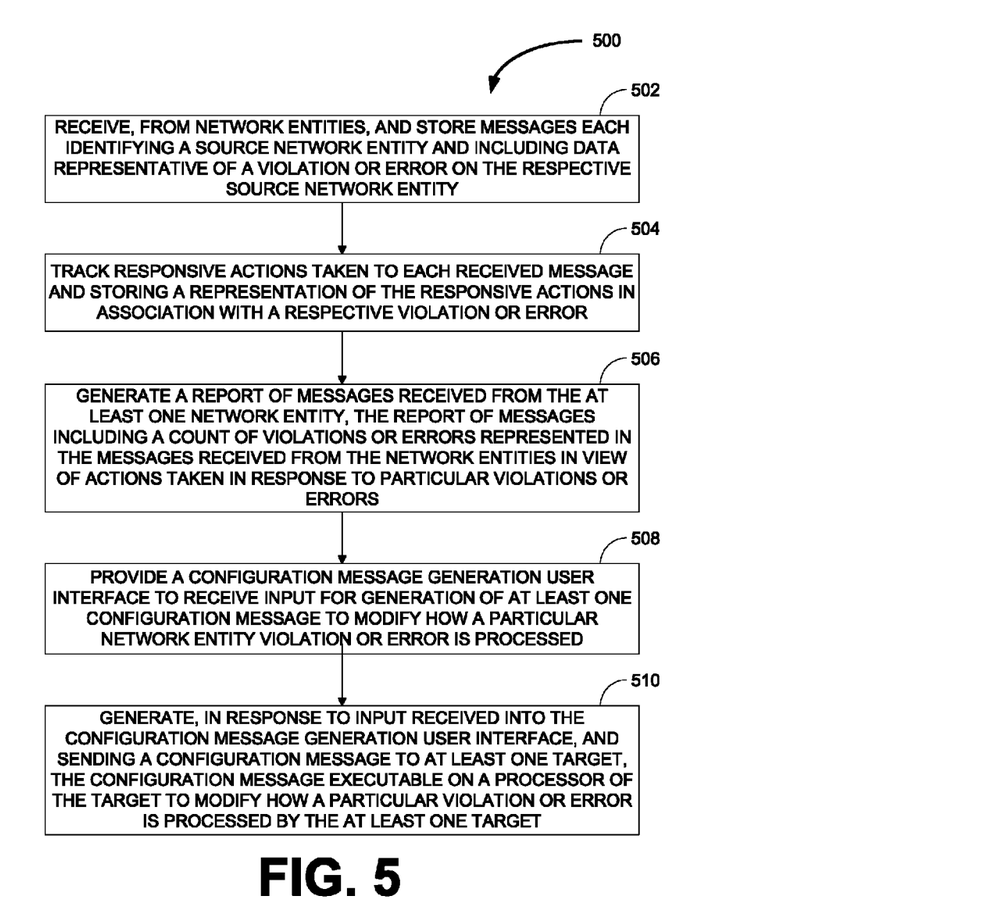
FIG. 5 is a block flow diagram of a method according to an example embodiment.

FIG. 5 is a block flow diagram of a method 500 according to an example embodiment. The method 500 is an example method of modifying how policy violation and error messages received from network entities that are underutilized may be processed to minimize such messages to improve network performance. The method 500 includes receiving 502, over a network from network entities, and storing, on a data storage device, messages each identifying a source network entity and including data representative of a violation or error on the respective source network entity. The method 500 continues by tracking 504 responsive actions, or the lack thereof, taken to each received message and storing a representation of the responsive actions in association with a respective violation or error. Subsequently, the method 500 includes executing 506 an instruction set on a computer processor to generate a report of messages received from the network entities, such as is illustrated in FIG. 3. The report of messages may include a count of violations or errors represented in the messages received from the network entities in view of actions taken in response to particular violations or errors. The method 500 further includes providing 508 a configuration message generation user interface, such as is illustrated in FIG. 4. The configuration message generation user interface is operable to receive input for generation of at least one configuration message to modify how a particular network entity violation or error is processed. The method 500 may then generate 510, in response to input received into the configuration message generation user interface, and send a configuration message to at least one target, the configuration message executable on a processor of the target to modify how a particular violation or error is processed by the at least one target. In another embodiment of the method 500 generating 510 and sending a configuration message to a target recipient to modify a configuration of how a particular violation or error is processed by the target recipient includes retrieving instructions for a manual process to effect the needed configuration change and sending the instructions via an electronic messaging system to an administrator.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method of a network management system, the method comprising:
   receiving, over a network from network entities, and storing, on a data storage device, messages each identifying a source network entity and including data representative of a violation or error on the respective source network entity;
   tracking administrator actions taken in response to each received message and storing a representation of the responsive actions in association with a respective violation or error, the stored representation of a responsive action taken with regard to at least one received message including an action to ignore the particular violations or errors identified therein;
   executing an instruction set on a computer processor with regard to subsequently received messages to identify the particular violations or errors that have occurred on a particular network entity;
   for each subsequently received message including one of the particular violations or errors, determining whether the particular network entity from which a respective message was received is configurable;
   when the particular network entity is configurable, automatically generating and sending, in response to identifying the particular violations or errors in a received message, a configuration message to the particular network entity, the configuration message executable on a processor of the particular network entity to modify how the particular violation or error is processed by the at least one particular network entity to be in accordance with the action taken in response to the particular violation or error; and
   when the particular network entity is not configurable and the action taken in response to the particular violation or error is to ignore the particular violation or error, automatically modifying a configuration of the network management system to ignore subsequently received messages including data representative of the particular violation or error.

2. The method of claim 1, wherein a source network entity from which a message is received is a device or processes enabled to communicate over the network according to a network management protocol.

3. The method of claim 1, wherein the at least one particular network entity includes a network management system.

4. The method of claim 1, wherein:
   the at least one particular network entity is a Simple Network Management Protocol client process executing on a network device; and
   the generating and sending the configuration message to the at least one particular network entity to modify how the particular violation or error is processed by the at least one particular network entity includes generating a Simple Network Management Protocol message instructing the Simple Network Management Protocol client process executing on a network device to no longer send messages with regard to the particular violation or error.

5. The method of claim 1, wherein the at least one particular network entity includes a network process.

6. The method of claim 1, wherein the at least one particular network entity includes a network device.

7. A non-transitory data storage device, with instructions stored thereon, which when executed by at least one processor of a computer, cause the computer to:
- receive, over a network from network entities, and storing, on a data storage device, messages each identifying a source network entity and including data representative of a violation or error on the respective source network entity;
- track administrator actions taken in response to each received message and storing a representation of the responsive actions in association with a respective violation or error, the stored representation of a responsive action taken with regard to at least one received message including an action to ignore the particular violations or errors identified therein;
- execute an instruction set on a computer processor with regard to subsequently received messages to identify the particular violations or errors that have occurred on a particular network entity;
- for each subsequently received message including one of the particular violations or errors, determine whether the particular network entity from which a respective message was received is configurable;
- when the particular network entity is configurable, automatically generate and send, in response to identifying the particular violations or errors in a received message, a configuration message to the particular network entity, the configuration message executable on a processor of the particular network entity to modify how the particular violation or error is processed by the at least one particular network entity to be in accordance with the action taken in response to the particular violation or error; and
- when the particular network entity is not configurable and the action taken in response to the particular violation or error is to ignore the particular violation or error, automatically modify a configuration of a network management system to ignore subsequently received messages including data representative of the particular violation or error.

8. The non-transitory data storage device of claim 7, wherein a source network entity from which a message is received is a device or processes enabled to communicate over the network according to a network management protocol.

9. The non-transitory data storage device of claim 7, wherein the at least one particular network entity includes a network management system.

10. The non-transitory data storage device of claim 7, wherein:
- the at least one particular network entity is a Simple Network Management Protocol client process executing on a network device; and
- the generating and sending the configuration message to the at least one particular network entity to modify how the particular violation or error is processed by the at least one particular network entity includes generating a Simple Network Management Protocol message instructing the Simple Network Management Protocol client process executing on a network device to no longer send messages with regard to the particular violation or error.

11. The non-transitory data storage device of claim 7, wherein the at least one particular network entity includes a network process.

12. The non-transitory data storage device of claim 7, wherein the at least one particular network entity includes a network device.

13. A system comprising:
- at least one processor;
- a memory device;
- a network interface device; and
- a network management system held in the memory device and executable on the at least one processor to:
  - receive, via the network interface device from network entities, and storing, on the memory device, messages each identifying a source network entity and including data representative of a violation or error on the respective source network entity;
  - track administrator actions taken in response to each received message and storing a representation of the responsive actions in association with a respective violation or error, the stored representation of a responsive action taken with regard to at least one received message including an action to ignore the particular violations or errors identified therein;
  - identify, in subsequently received messages, the particular violations or errors that have occurred on a particular network entity;
  - for each subsequently received message including one of the particular violations or errors, determine whether the particular network entity from which a respective message was received is configurable;
  - when the particular network entity is configurable, automatically generate and send, via the network interface device and in response to identifying the particular violations or errors in a received message, a configuration message to the particular network entity, the configuration message executable on a processor of the particular network entity to modify how the particular violation or error is processed by the at least one particular network entity; and
  - when the particular network entity is not configurable and the action taken in response to the particular violation or error is to ignore the particular violation or error, automatically modifying a configuration of the network management system to ignore subsequently received messages including data representative of the particular violation or error.

14. The system of claim 13, wherein a source network entity from which a message is received is a device or processes enabled to communicate over the network according to a network management protocol.

15. The system of claim 13, wherein the at least one particular network entity includes a network management system.

16. The system of claim 13, wherein:
- the at least one particular network entity is a Simple Network Management Protocol client process executing on a network device; and
- the generating and sending the configuration message to the at least one particular network entity to modify how the particular violation or error is processed by the at least one particular network entity includes generating a Simple Network Management Protocol message instructing the Simple Network Management Protocol client process executing on a network device to no longer send messages with regard to the particular violation or error.

17. The system of claim 13, wherein the at least one particular network entity includes a network process.

18. The system of claim 13, wherein the at least one particular network entity includes a network device.

\* \* \* \* \*